United States Patent
Harmon

(10) Patent No.: US 11,487,865 B2
(45) Date of Patent: Nov. 1, 2022

(54) METHOD AND SYSTEM FOR SSIS PASSWORD MANAGEMENT INTEGRATION

(71) Applicant: JPMorgan Chase Bank, N.A., New York, NY (US)

(72) Inventor: Jason Harmon, Hickory Creek, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 219 days.

(21) Appl. No.: 16/910,530

(22) Filed: Jun. 24, 2020

(65) Prior Publication Data

US 2020/0410086 A1 Dec. 31, 2020

Related U.S. Application Data

(60) Provisional application No. 62/866,240, filed on Jun. 25, 2019.

(51) Int. Cl.
| | |
|---|---|
| *G06F 21/46* | (2013.01) |
| *G06F 21/31* | (2013.01) |
| *G06F 21/60* | (2013.01) |
| *G06F 16/16* | (2019.01) |
| *G06F 16/17* | (2019.01) |
| *G06F 9/54* | (2006.01) |
| *G06F 21/62* | (2013.01) |

(52) U.S. Cl.
CPC ............ *G06F 21/46* (2013.01); *G06F 9/54* (2013.01); *G06F 16/164* (2019.01); *G06F 16/168* (2019.01); *G06F 16/1734* (2019.01); *G06F 21/31* (2013.01); *G06F 21/602* (2013.01); *G06F 21/6218* (2013.01)

(58) Field of Classification Search
CPC ...... G06F 21/46; G06F 16/164; G06F 16/168; G06F 16/1734; G06F 9/54; G06F 21/31; G06F 21/602; G06F 21/6218
See application file for complete search history.

(56) References Cited

U.S. PATENT DOCUMENTS

| | | | | |
|---|---|---|---|---|
| 7,958,347 | B1 * | 6/2011 | Ferguson | H04L 9/321 |
| | | | | 726/8 |
| 10,110,600 | B1 * | 10/2018 | Simca | G06N 20/00 |
| 2009/0320108 | A1 * | 12/2009 | Livingston | G06F 21/31 |
| | | | | 726/6 |
| 2009/0328154 | A1 * | 12/2009 | Field | G06F 21/46 |
| | | | | 726/4 |
| 2017/0300704 | A1 * | 10/2017 | Subramanian | G06F 21/44 |
| 2018/0007059 | A1 * | 1/2018 | Innes | H04L 9/3228 |
| 2018/0041467 | A1 * | 2/2018 | Vats | G06F 16/282 |
| 2018/0176195 | A1 * | 6/2018 | Pangam | G06F 16/951 |

* cited by examiner

*Primary Examiner* — Kristine L Kincaid
*Assistant Examiner* — Zoha Piyadehghibi Tafaghodi
(74) *Attorney, Agent, or Firm* — Greenblum & Bernstein, P.L.C.

(57) ABSTRACT

A method for facilitating credential management in a Structured Query Language (SQL) Server Integration Services (SSIS) environment is provided. The method includes identifying a credential update trigger event; accessing a user credential at an electronic password vault (EPV) in response to the credential update trigger event, the user credential including at least one string; parsing the user credential to identify a username and a password that are associated with the user credential; splitting the user credential into the username and the password; updating the password; and storing the updated password in a SSIS database.

20 Claims, 7 Drawing Sheets

METHOD AND SYSTEM FOR SSIS PASSWORD MANAGEMENT INTEGRATION

CROSS-REFERENCE TO RELATED APPLICATIONS

This application claims the benefit of U.S. Provisional Patent Application Ser. No. 62/866,240, filed Jun. 25, 2019, which is hereby incorporated by reference in its entirety.

BACKGROUND

1. Field of the Disclosure

This technology generally relates to methods and systems for Structured Query Language (SQL) Server Integration Services (SSIS) password management, and more particularly to methods and systems for facilitating automatic updating of passwords in a SSIS database based on data in an electronic password vault (EPV).

2. Background Information

Large organizations today maintain substantial amounts of data in complex enterprise networks. Often, these organizations must migrate the data from one server or collection of servers to another, either within the organization or otherwise. To facilitate these data migration tasks, relational database systems such as, for example, Microsoft's SQL Server may be leveraged to complete a myriad of data migration and management tasks. SQL Server Integration Services (SSIS) is a component of the Microsoft SQL Server database software that may be used to perform a broad range of data migration tasks and serves as a platform for data integration and workflow applications. In the SSIS, user credentials such as, for example, passwords are essential to moderating access to these systems.

In user environments where access must be carefully controlled such as, for example, when dealing with sensitive financial information, maintaining and updating user credentials are important maintenance actions to prevent unauthorized access to sensitive data and to ensure that the sensitive data remains uncompromised. Further complexity is added when user passwords are stored in an electronic password vault (EPV) that may store user credentials in a difficult to access format such as, for example, an encrypted file format. Known methods of updating passwords in SSIS environments are limited and often require significant user intervention such as, for example, requiring manual updates of user credentials. The manual updating process is inefficient and burdensome to system administrators responsible for managing SSIS environments. Furthermore, manual password maintenance is associated with additional risks such as, for example, mistyped passwords during a password change and security concerns relating to individuals having knowledge of passwords.

Therefore, there is a need for automatically updating passwords in SSIS databases based on data in EPVs to enhanced security and optimization of SSIS systems.

SUMMARY

The present disclosure, through one or more of its various aspects, embodiments, and/or specific features or sub-components, provides, inter alia, various systems, servers, devices, methods, media, programs, and platforms for facilitating automatic updating of passwords in a SSIS database based on data in an electronic password vault (EPV).

According to an aspect of the present disclosure, a method for facilitating credential management in a Structured Query Language (SQL) Server Integration Services (SSIS) environment is provided. The method may be implemented by at least one processor. The method may include identifying at least one credential update trigger event; accessing at least one user credential at an electronic password vault (EPV) in response to the at least one credential update trigger event, the at least one user credential including at least one string; parsing the at least one user credential to identify a username and a password that are associated with the at least one user credential; splitting the at least one user credential into the username and the password; updating the password; and storing the updated password in a SSIS database.

In accordance with an exemplary embodiment, the at least one credential update trigger event may include at least one from among a periodic credential update schedule and an episodic credential update schedule, the periodic credential update schedule may include at least once every sixty days.

In accordance with an exemplary embodiment, the at least one string may include at least one from among a string of alphanumeric text and a string of character symbols.

In accordance with an exemplary embodiment, when the at least one credential update trigger event may be identified, the method may further include identifying at least one job that is associated with the at least one user credential, the at least one job may include a currently executing job; determining a stopping point for the at least one job; disabling the at least one job based on the determined stopping point; and preventing at least one new job that is associated with the at least one user credential from executing.

In accordance with an exemplary embodiment, the stopping point may include a point in a process flow when the at least one job has completed at least one task.

In accordance with an exemplary embodiment, the updating may further include decrypting the password that is associated with the at least one user credential; automatically generating, via a password generator, a new password based on a predetermined requirement; replacing the decrypted password with the new password; and encrypting, by the at least one processor, the new password.

In accordance with an exemplary embodiment, the method may further include automatically generating at least one electronic document that may include information relating to the updating, the information may include a timestamp of when the updating occurred; and storing the at least one electronic document in the SSIS database.

In accordance with an exemplary embodiment, the method may further include receiving, via a graphical user interface, at least one request for a record of the updating; obtaining, from the SSIS database, the at least one electronic document corresponding to the request; automatically generating the record based on the obtained at least one electronic document; and displaying, via the graphical user interface, the generated record.

In accordance with an exemplary embodiment, the predetermined requirement may include at least one from among a password length requirement, a password complexity requirement, and a previous use of the password requirement.

In accordance with an exemplary embodiment, the at least one user credential at the EPV may be accessed by using an application programming interface (API) call.

According to an aspect of the present disclosure, a computing device configured to implement an execution of a method for facilitating credential management in a Structured Query Language (SQL) Server Integration Services (SSIS) environment is disclosed. The computing device comprising a processor; a memory; and a communication interface coupled to each of the processor and the memory, wherein the processor may be configured to identify at least one credential update trigger event; access at least one user credential at an electronic password vault (EPV) in response to the at least one credential update trigger event, the at least one user credential including at least one string; parse the at least one user credential to identify a username and a password that are associated with the at least one user credential; split the at least one user credential into the username and the password; update the password; and store the updated password in a SSIS database.

In accordance with an exemplary embodiment, the at least one credential update trigger event may include at least one from among a periodic credential update schedule and an episodic credential update schedule, the periodic credential update schedule may include at least once every sixty days.

In accordance with an exemplary embodiment, the at least one string may include at least one from among a string of alphanumeric text and a string of character symbols.

In accordance with an exemplary embodiment, when the at least one credential update trigger event is identified, the processor may be further configured to determine at least one job that is associated with the at least one user credential, the at least one job may include a currently executing job; determining a stopping point for the at least one job; disable the at least one job based on the determined stopping point; and prevent at least one new job that is associated with the at least one user credential from executing.

In accordance with an exemplary embodiment, the stopping point may include a point in a process flow when the at least one job has completed at least one task.

In accordance with an exemplary embodiment, for the updating, the processor may be further configured to decrypt the password that is associated with the at least one user credential; automatically generate, via a password generator, a new password based on a predetermined requirement; replace the decrypted password with the new password; and encrypt the new password.

In accordance with an exemplary embodiment, the processor may be further configured to automatically generate at least one electronic document that may include information relating to the updating, the information may include a timestamp of when the updating occurred; and store the at least one electronic document in the SSIS database.

In accordance with an exemplary embodiment, the processor may be further configured to receive, via a graphical user interface, at least one request for a record of the updating; obtain, from the SSIS database, the at least one electronic document corresponding to the request; automatically generate the record based on the obtained at least one electronic document; and display, via the graphical user interface, the generated record.

In accordance with an exemplary embodiment, the predetermined requirement may include at least one from among a password length requirement, a password complexity requirement, and a previous use of the password requirement.

In accordance with an exemplary embodiment, the processor may be further configured to access the at least one user credential at the EPV by using an application programming interface (API) call.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
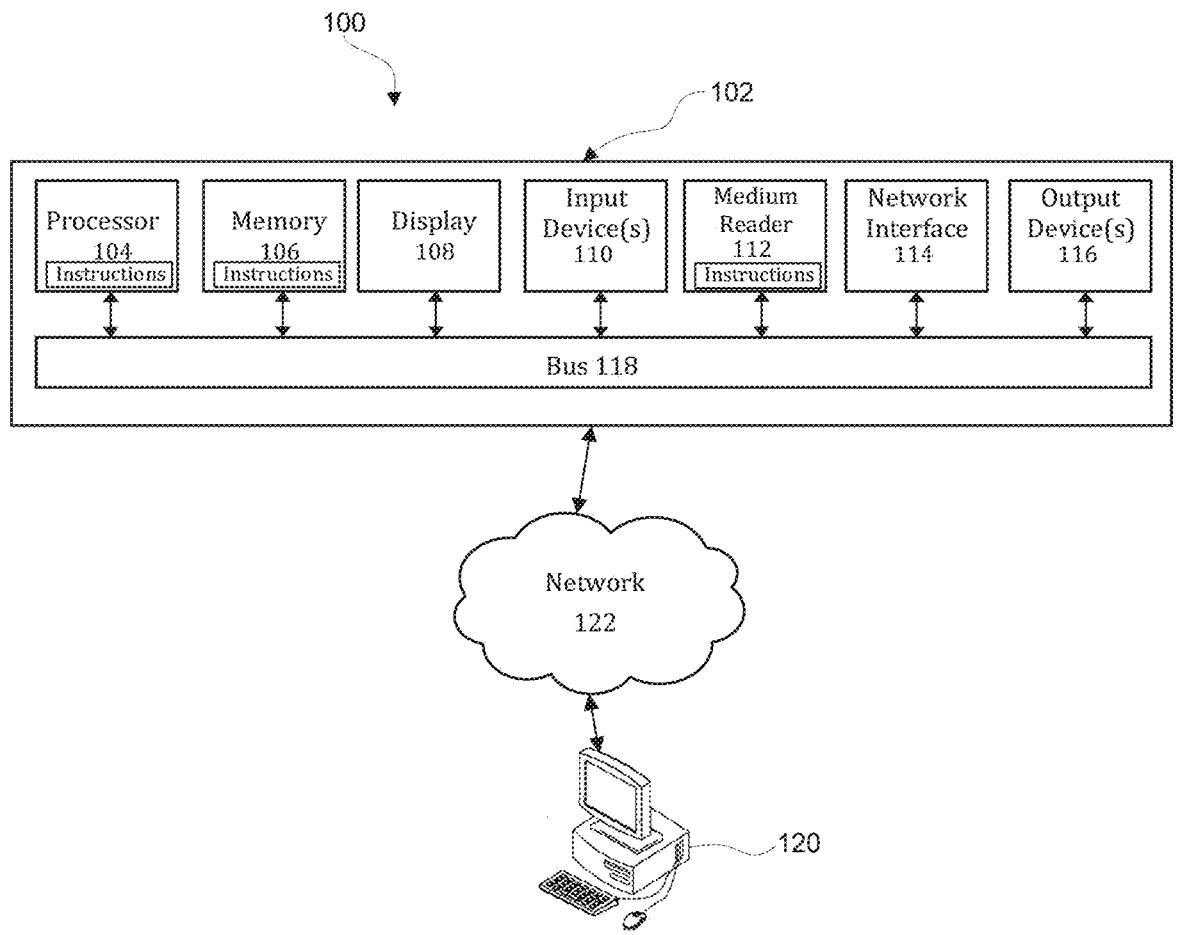
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automatic updating of passwords in a SSIS database based on data in an electronic password vault (EPV).

Figure 2:
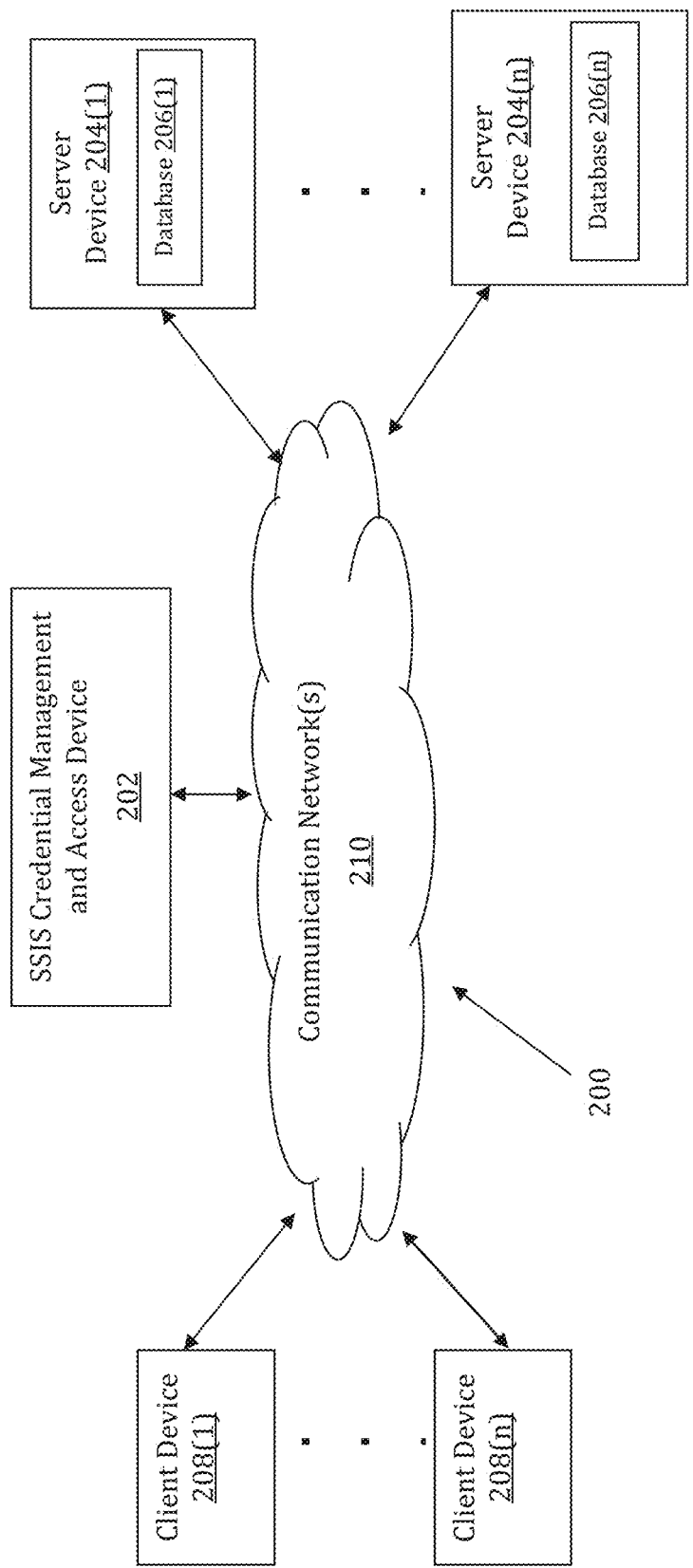
FIG. 2 illustrates an exemplary diagram of a network environment.

Referring to FIG. 2, a schematic of an exemplary network environment 200 for implementing a method for facilitating automatic updating of passwords in a SSIS database based on data in an EPV is illustrated. In an exemplary embodiment, the method is executable on any networked computer platform, such as, for example, a personal computer (PC).

The method for facilitating automatic updating of passwords in a SSIS database based on data in an EPV may be implemented by a SSIS Credential Management and Access (SCMA) device 202. The SCMA device 202 may be the same or similar to the computer system 102 as described with respect to FIG. 1. The SCMA device 202 may store one or more applications that can include executable instructions that, when executed by the SCMA device 202, cause the SCMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SCMA device 202 itself, may be located in virtual server(s) running in a cloud-based computing environment rather than being tied to one or more specific physical network computing devices. Also, the application(s) may be running in one or more virtual machines (VMs) executing on the SCMA device 202. Additionally, in one or more embodiments of this technology, virtual machine(s) running on the SCMA device 202 may be managed or supervised by a hypervisor.

In the network environment 200 of FIG. 2, the SCMA device 202 is coupled to a plurality of server devices 204(1)-204(n) that hosts a plurality of databases 206(1)-206(n), and also to a plurality of client devices 208(1)-208(n) via communication network(s) 210. A communication interface of the SCMA device 202, such as the network interface 114 of the computer system 102 of FIG. 1, operatively couples and communicates between the SCMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SCMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SCMA devices that efficiently implement a method for facilitating automatic updating of passwords in a SSIS database based on data in an EPV.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SCMA device 202 may be a standalone device or integrated with one or more other devices or apparatuses, such as one or more of the server devices 204(1)-204(n), for example. In one particular example, the SCMA device 202 may include or be hosted by one of the server devices 204(1)-204(n), and other arrangements are also possible. Moreover, one or more of the devices of the SCMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204

(*n*) may include, among other features, one or more processors, a memory, and a communication interface, which are coupled together by a bus or other communication link, although other numbers and/or types of network devices may be used. The server devices **204(1)-204(*n*) in this example may process requests received from the SCMA device 202 via the communication network(s) 210** according to the HTTP-based and/or JavaScript Object Notation (JSON) protocol, for example, although other protocols may also be used.

The server devices **204(1)-204(*n*) may be hardware or software or may represent a system with multiple servers in a pool, which may include internal or external networks. The server devices 204(1)-204(*n*) hosts the databases 206(1)-206(*n*)** that are configured to store data that relates to usernames, passwords, credential update trigger events, alphanumeric texts, character symbols, electronic documents, and reports.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the SCMA device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208** is a wireless mobile communication device, i.e., a smart phone.

The client devices **208(1)-208(*n*) may run interface applications, such as standard web browsers or standalone client applications, which may provide an interface to communicate with the SCMA device 202 via the communication network(s) 210 in order to communicate user requests and information. The client devices 208(1)-208(*n*)** may further include, among other features, a display device, such as a display screen or touchscreen, and/or an input device, such as a keyboard, for example.

Although the exemplary network environment 200 with the SCMA device 202, the server devices **204(1)-204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SCMA device 202, the server devices **204(1)-204(*n*), or the client devices 208(1)-208(*n*), for example, may be configured to operate as virtual instances on the same physical machine. In other words, one or more of the SCMA device 202, the server devices 204(1)-204(*n*), or the client devices 208(1)-208(*n*) may operate on the same physical device rather than as separate devices communicating through communication network(s) 210. Additionally, there may be more or fewer SCMA devices 202, server devices 204(1)-204(*n*), or client devices 208(1)-208(*n*) than illustrated in FIG. 2**.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
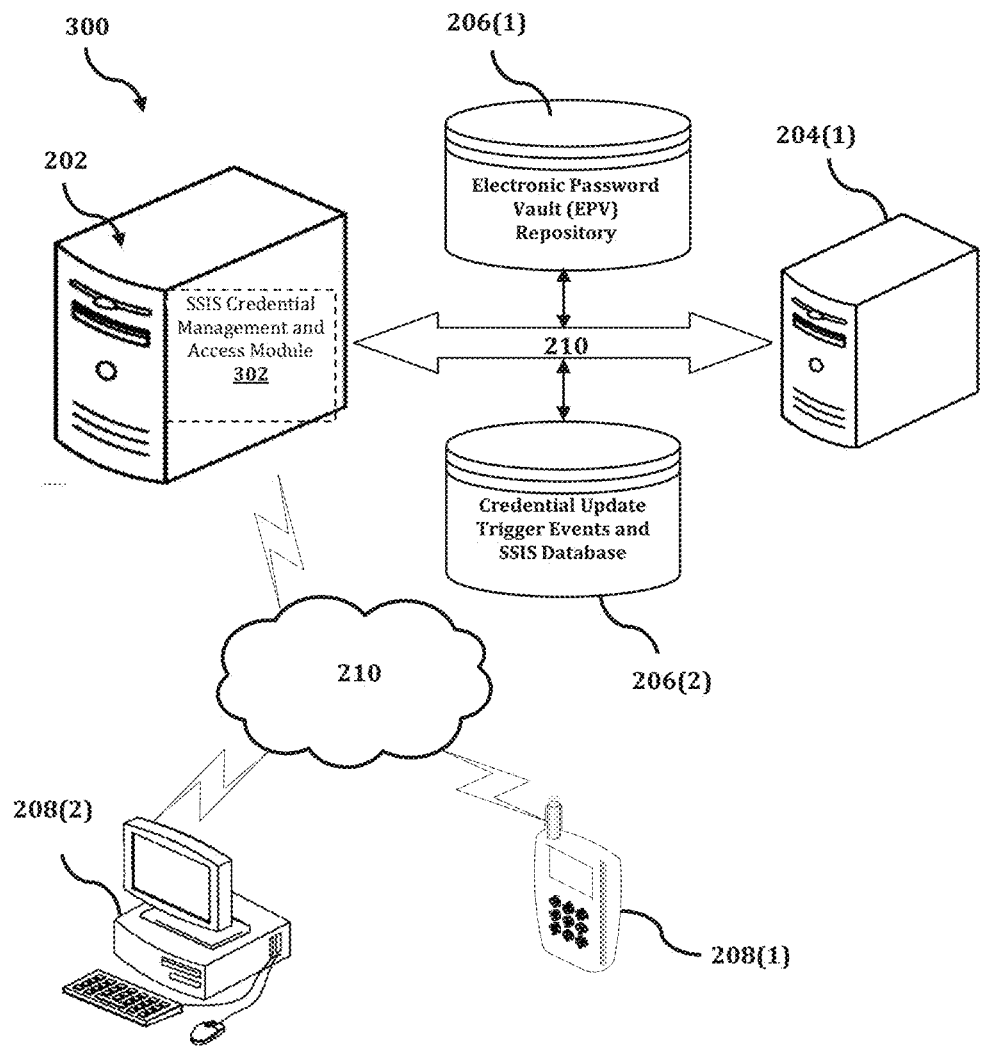
FIG. 3 shows an exemplary system for implementing a method for facilitating automatic updating of passwords in a SSIS database based on data in an electronic password vault (EPV).

The SCMA device 202 is described and shown in FIG. 3 as including a SSIS credential management and access module 302, although it may include other rules, policies, modules, databases, or applications, for example. As will be described below, the SSIS credential management and access module 302 is configured to implement a method for facilitating automatic updating of passwords in a SSIS database based on data in an EPV.

An exemplary process 300 for implementing a mechanism for facilitating automatic updating of passwords in a SSIS database based on data in an EPV by utilizing the network environment of FIG. 2 is shown as being executed in FIG. 3. Specifically, a first client device 208(1) and a second client device 208(2) are illustrated as being in communication with SCMA device 202. In this regard, the first client device 208(1) and the second client device 208(2) may be "clients" of the SCMA device 202 and are described herein as such. Nevertheless, it is to be known and understood that the first client device 208(1) and/or the second client device 208(2) need not necessarily be "clients" of the SCMA device 202, or any entity described in association therewith herein. Any additional or alternative relationship may exist between either or both of the first client device 208(1) and the second client device 208(2) and the SCMA device 202, or no relationship may exist.

Further, SCMA device 202 is illustrated as being able to access an electronic password vault (EPV) repository 206(1) and a credential update trigger events and SSIS database 206(2). The SSIS credential management and access module 302 may be configured to access these databases for implementing a method for facilitating automatic updating of passwords in a SSIS database based on data in an EPV.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SCMA device 202 via broadband or cellular communication. Of course, these embodiments are merely exemplary and are not limiting or exhaustive.

Upon being started, the SSIS credential management and access module 302 executes a process for facilitating automatic updating of passwords in a SSIS database based on data in an EPV. An exemplary process for facilitating automatic updating of passwords in a SSIS database based on data in an EPV is generally indicated at flowchart 400 in FIG. 4.

Figure 4:
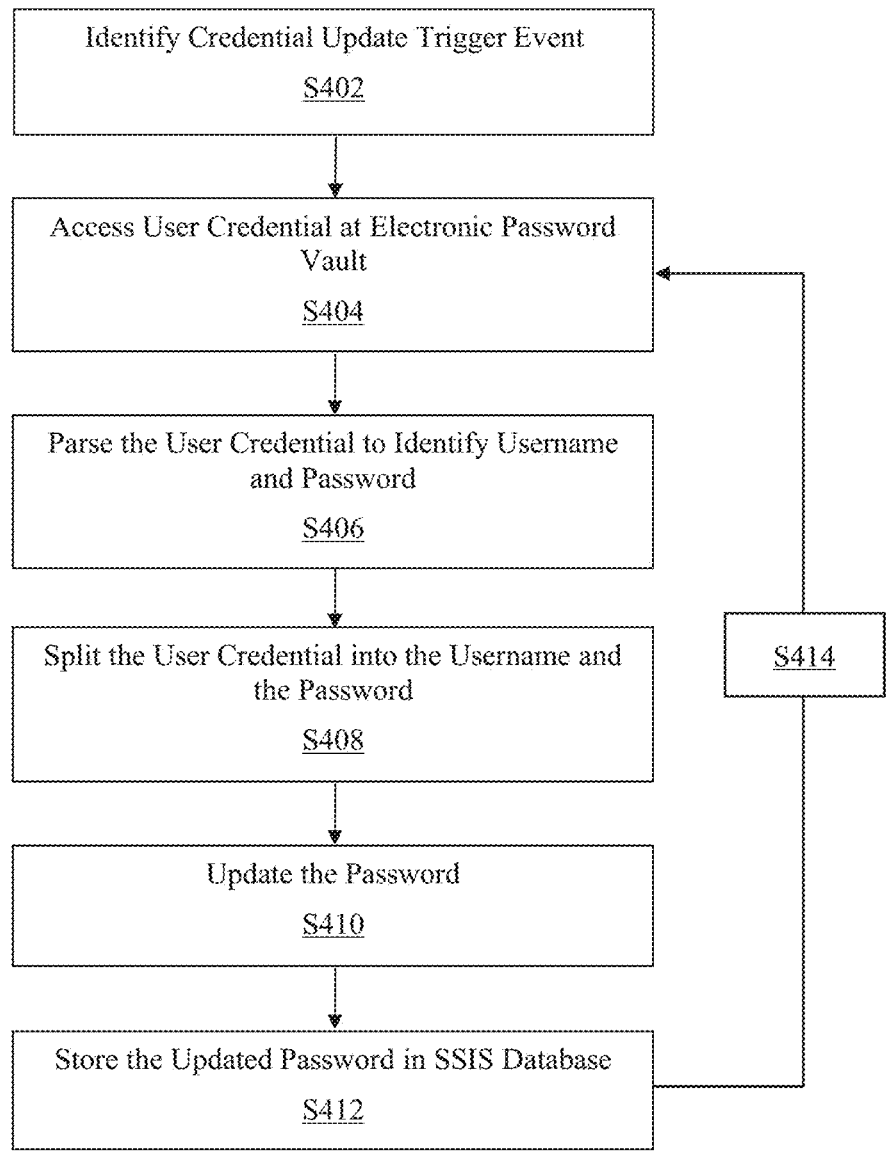
FIG. 4 is a flowchart of an exemplary process for implementing a method for facilitating automatic updating of passwords in a SSIS database based on data in an EPV.

In the process 400 of FIG. 4, at step S402, a credential update trigger event may be identified. SQL server triggers may include special stored procedures that are executed automatically in response to a database object event, database event, and server event. For example, SQL server triggers may include data manipulation language (DML) triggers, data definition language (DDL) triggers, and database event triggers. The DML triggers may be invoked automatically in response to insert events, update events, and delete events against a table. The DDL triggers may be invoked in response to create statements, alter statements, and drop statements. The DDL triggers may also be invoked in response to some system stored procedures that perform DDL-like operations. The database event triggers may be invoked in response to database events such as, for example, a log on event, a log off event, an error event, a startup event, and a shutdown event. The Database event triggers may also be invoked either by a particular schema and/or a particular user in the database.

In an exemplary embodiment, the credential update trigger event may include server triggers such as, for example, an elapsed period of time, a recognized security event that includes a security breach, and an administrator login. The elapsed period of time may include predetermined thresholds such as, for example, when a process has not been invoked for 30 days, 60 days, or a total amount of days based on the number of processes. In another exemplary embodiment, the credential update trigger event may include a scheduled event such as, for example, a scheduled event that occurs at least once every 60 days.

In another exemplary embodiment, the credential update trigger event may be identified by utilizing scanning techniques such as, for example, a sequential scanning technique and/or an index scanning technique. The sequential scanning technique may include reading each row of the table in sequential order for the desired data and validating encountered columns based on a validity condition. Similarly, the index scanning technique may include reading each index page from a clustered index and a non-clustered index for the desired data. In another exemplary embodiment, the credential update trigger event may be identified by utilizing scanning techniques such as, for example, an index seek technique. The index seek technique may utilize a structure of a non-clustered index and a clustered index to find a single row or a specific subset of rows.

At step S404, a user credential at an electronic password vault (EPV) may be accessed in response to the credential update trigger event. The user credential may include a string. In an exemplary embodiment, the EPV may include a software program that keeps a number of passwords in a secure digital location. The EPV may be encrypted in addition to encrypting the stored passwords for increased security. In another exemplary embodiment, the EPV may include a system that stores passwords for various privileged accounts in a privileged account management system. The privileged account management system may automatically rotate passwords based on a predetermined time period such as, for example, at least once every day and store current passwords in the EPV. As will be appreciated by a person of ordinary skill in the art, the user credential may include a username and a password authentication token that is bound to a particular user.

In another exemplary embodiment, the user credential at the EPV may be accessed by using an application programming interface (API) call. The API may include a computing interface that defines interactions between multiple software intermediaries. The API may define the kinds of calls or requests that can be made, how to make them, data formats that should be used, and conventions to follow. The API may also provide extension mechanisms to extend existing functionalities.

In another exemplary embodiment, the string may include a sequence of characters such as, for example, a string of alphanumeric text and a string of character symbols, either as a literal constant or as a variable. The string may include data types which are implemented as an array data structure of bytes that stores a sequence of elements as characters by using character encoding. As will be appreciated by a person of ordinary skill in the art, the string may also denote more general arrays, other sequence data types and list structures.

At step S406, the user credential may be parsed to identify a username and a password that may be associated with the user credential. In an exemplary embodiment, parsing may include analysis techniques such as, for example, syntax analysis or syntactic analysis. The parsing process may include analyzing a string of symbols based on a language such as, for example, a computer programming language and/or a data structural language. Then, at step S408, the user credential may be split into the username and the password. As will be appreciated by a person of ordinary skill in the art, the user credential string may be split by using any SQL server function to create a row of substrings based on a specified separator.

At step S410, the password may be updated and then, at step S412, the updated password may be stored in a SSIS database. In an exemplary embodiment, the SQL server integration services (SSIS) may include database software such as, for example, Microsoft's SQL server that may be used to perform data migration tasks. The SSIS may include a platform for data integration and workflow applications. In another exemplary embodiment, the SSIS may include data warehousing capabilities for data extraction, data transformation, and data loading. As will be appreciated by a person of ordinary skill in the art, the SSIS database may be referred to as a SSISDB catalog and may store objects such as, for example, projects, packages, parameters, environments, and operational history.

At step S414, the process may be repeated for another user credential. In an exemplary embodiment, the process may be initiated based on a scheduled credential update trigger event such as, for example, a periodic credential update schedule and an episodic credential update schedule. The periodic credential update schedule may include a recurring maintenance timeframe such as, for example, scheduling the credential update schedule for at least once every sixty days. The episodic credential update schedule may include a credential update trigger event based on an unanticipated situation such as, for example, when the password in the SSIS database has been compromised.

In another exemplary embodiment, when the at least one credential update trigger event has been identified, a job that is associated with the user credential may also be identified. The job may include a currently executing job in the SSIS. Then, a stopping point for the job may be determined. The stopping point may include a point in a process flow when the job has completed a given task. The job may be disabled based on the determined stopping point to prevent errors associated with a change in user credentials. Additionally, a new job that is associated with the user credential may be prevented from executing to prevent similar errors.

In another exemplary embodiment, the updating may include decrypting the password that is associated with the user credential. Then, a new password based on a predetermined requirement such as, for example, a password length requirement, a password complexity requirement, and a previous use of the password requirement may be automatically generated via a password generator. The decrypted password may be replaced with the new password and re-encrypted before storage. An electronic document that includes information relating to the updating may also be generated during the updating. The generated information may include pertinent data corresponding to the updating such as, for example, a timestamp of when the updating occurred. This electronic document may also be stored in the SSIS database.

In another exemplary embodiment, a request for a record of the updating may be received via a graphical user interface. The request may include parameters such as, for example, a record of updates for a specified time period. Then, the electronic document corresponding to the request may be obtained from the SSIS database based on the parameters. The requested record may be automatically generated based on the obtained electronic document and displayed on the graphical user interface.

Figure 5:
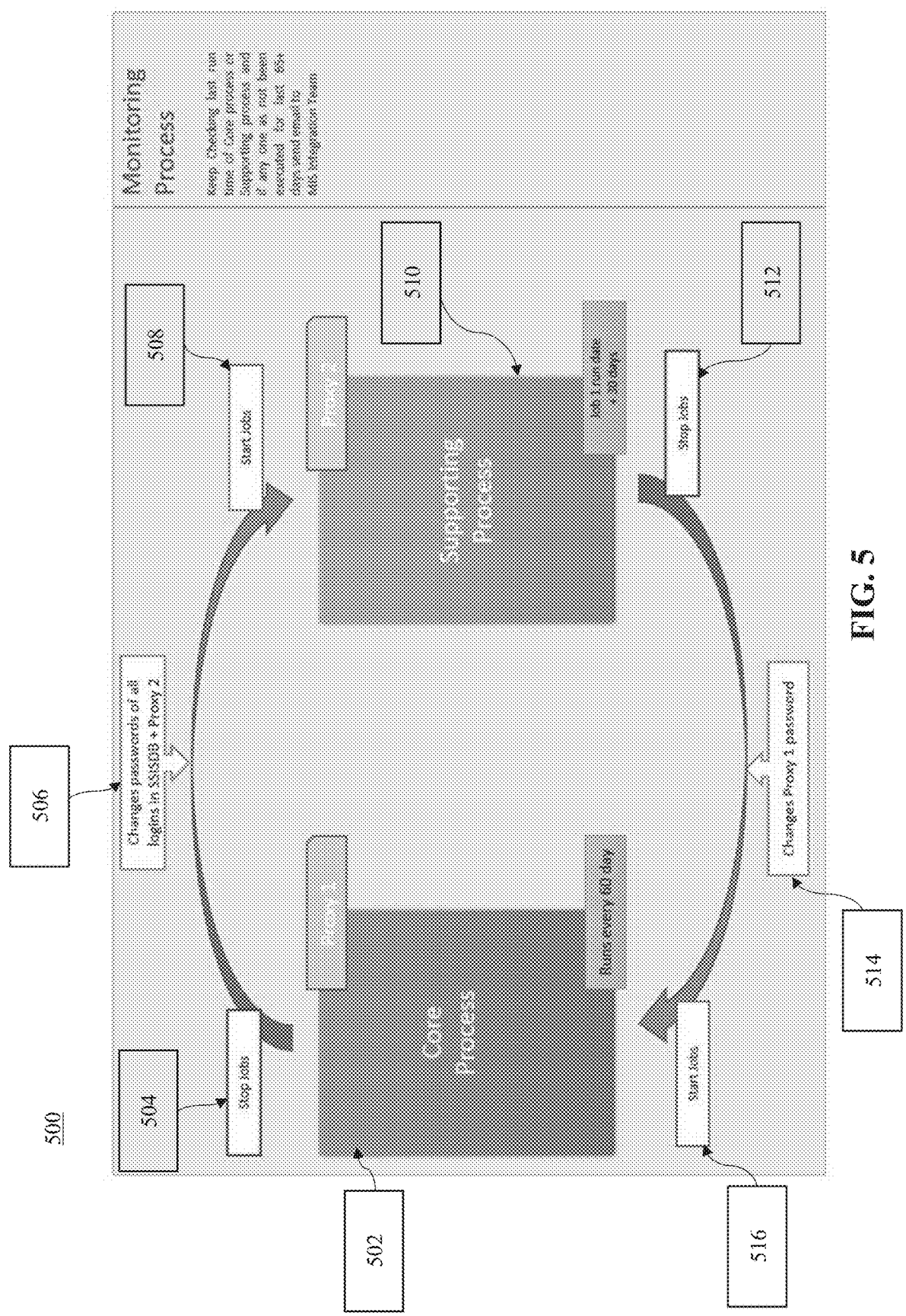
FIG. 5 is a diagram illustrating a continuous password management process that is usable for implementing a method for facilitating automatic updating of passwords in a SSIS database based on data in an EPV, according to an exemplary embodiment.

FIG. 5 is a diagram illustrating a continuous password management process that is usable for implementing a method for facilitating automatic updating of passwords in a SSIS database based on data in an EPV, according to an exemplary embodiment. FIG. 5 shows a monitoring process which continuously checks last run times of core processed and/or supporting processes to determine whether a notification must be sent to administrative personnel.

Process flow 500 may begin at the initialization of a core process at step 502. Initialization of the core process may be automatic such that, for example, the core process may be initialized according to a timer or schedule, as well as initialized manually through user input. In an exemplary embodiment, the core process may be configured to initialize automatically according to a trigger event such as, for example, an elapsed period of time, a recognized security event (e.g. a security breach), and an administrator login. As such, a trigger event may trigger the core process to run every 60 days for example. Further, possible trigger events are contemplated and will be recognized by those of skill in the art. In another exemplary embodiment, the core process may require entry of a first proxy password. The first proxy password may include an administrator password that may be associated with elevated privileges such as, for example, the ability to initialize the core process. In another exemplary embodiment, the first proxy password may be stored in an electronic password vault (EPV).

The core process may be configured to stop jobs running in the SSIS at step 504. In another exemplary embodiment, the core process may be configured to stop all jobs or processes running in the SSIS. In another exemplary embodiment, the core process may selectively stop jobs that may be associated with credentials that are required to be updated. The jobs must be stopped to prevent situations where a password change could occur mid-job and potentially lead to system errors. Moreover, some jobs make multiple connections at different times, so a connection could fail when a connection is attempted before a password update has been received.

At step 506, user credentials are changed or updated. User credentials may include information such as, for example, a username and a password. In another exemplary embodiment, the username and password may be stored as a combined string such as, for example, a string of alphanumeric text. In another exemplary embodiment, username and password information may be stored in separate fields, but retrieved as a combined string by using a single application programming interface (API) call. Retrieving username and password information via a single API call may reduce the total number of API calls and improve system efficiency.

Updating credentials may comprise changing or updating at least one from among a username and a password. In another exemplary embodiment, passwords may be updated using a password generator to enhance security of the password such as, for example, to ensure that passwords are not too similar to prior versions of the password and ensure conformity to password rules and requirements such as, for example, length and complexity requirements. In another exemplary embodiment, user credentials are stored in an EPV such as, for example, a CyberArk Enterprise Password Vault. As used herein, EPV may represent an electronic password vault, enterprise password vault, or their equivalent. In another exemplary embodiment, passwords may be updated via the EPV and retrieved by the core process. In another exemplary embodiment, the user credentials may be encrypted and must be decrypted before they may be updated.

In cases where user credentials are stored as a combined string, the string may be parsed to identify the username and password of the string. Once the username and password are identified, they may be separated and stored in a database table such as, for example, a structured query language (SQL) table. Additional information such as, for example, metadata information that includes a timestamp, may also be stored in the database table to record information describing the update of the credentials. The metadata information may be used to create a forensic record of the credential update for auditing and other purposes. In another exemplary embodiment, the user credential string may comprise additional characters that are not the username or password. These additional characters may be truncated or removed from the combined string during the credential update process such as, for example, when the updated credentials are stored in the database table. This may allow for easier storage and retrieval of the username and password combinations associated with a given user credential. In another exemplary embodiment, a database table may be updated with metadata information describing each successful user credential updated.

In addition to updating user credentials, the core process may be further configured to update a second proxy password associated with a supporting process as discussed below. The second proxy password may be updated in substantially the same way as user credentials. In another exemplary embodiment, the second proxy password may be stored in the same location as user credentials such as, for example, at an EPV. In another exemplary embodiment, the second proxy password may be stored at a different location.

At step 508, jobs may be started or resumed, including, for example, jobs stopped at step 504.

At step 510, a supporting process may be initiated. The supporting process may be initiated after an elapsed amount of time such as, for example, 30 days after the core process was initiated. In an exemplary embodiment, the supporting process may require input of the second proxy password to begin. Similar to the first proxy password, the second proxy password may be an administrator password associated with elevated privileges such as, for example, the ability to initialize the supporting process. In another exemplary embodiment, the second proxy password may be stored in an electronic password vault.

At step 512, jobs may be stopped. All jobs may be stopped, or in the alternative, only certain jobs may be stopped. After the jobs have stopped, the supporting process may update the first proxy password at step 514. The first proxy password may be updated in substantially the same way as the user credentials are updated. In another exemplary embodiment, the first proxy password may be stored in the same location as the user credentials and the second proxy password such as, for example, at an EPV. In another exemplary embodiment, the first proxy password may be stored at a different location. After the first proxy password is updated, jobs may be started or resumed at step 516. The core process may then be initialized with the updated first proxy password. It will be appreciated that the core process cannot update the password it runs under. The core process may update the password for the supporting process while the supporting process may update the password for the core process.

Figure 6:
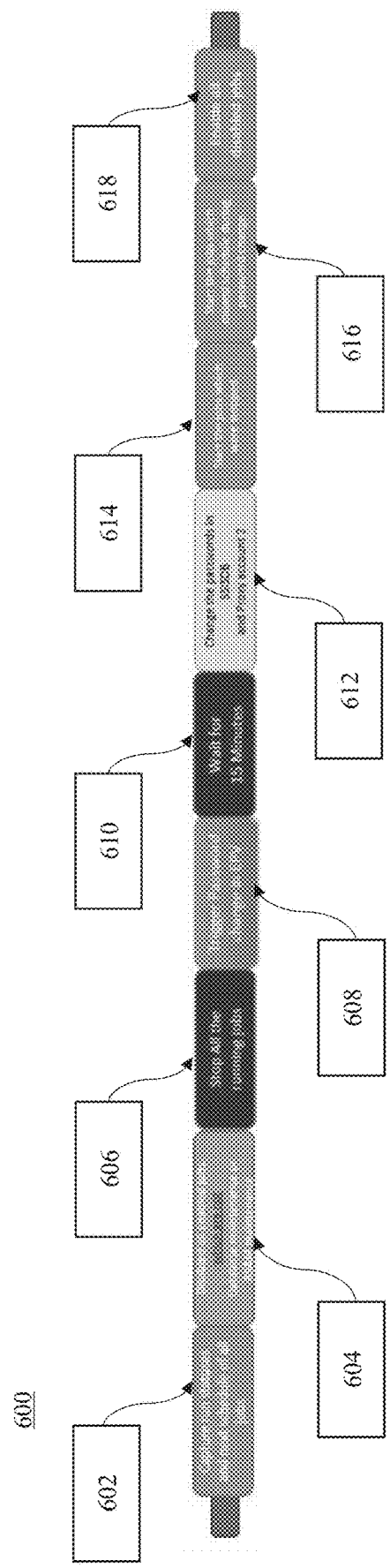
FIG. 6 is a diagram illustrating a password management process flow that is usable for implementing a method for facilitating automatic updating of passwords in a SSIS database based on data in an EPV, according to an exemplary embodiment.

FIG. 6 is a diagram illustrating a password management process flow that is usable for implementing a method for facilitating automatic updating of passwords in a SSIS database based on data in an EPV, according to an exemplary embodiment. Process flow 600, at step 602, may capture run status for jobs active in an SSIS environment.

In another exemplary embodiment, a schedule associated with the jobs may also be captured. Alternatively, the schedule may be generated according to observed run statuses. At step 604, jobs may be disabled. In an exemplary embodiment, only jobs that are not related to database maintenance or identity management such as, for example, RSAM maintenance are stopped or disabled. At step 606, all jobs may be stopped or disabled. It will be appreciated that at step 604, new jobs are prevented from starting while at step 606, all jobs that are currently running are stopped. At step 608, user credentials may be changed. In another exemplary embodiment, the credentials may be changed in an EPV where the credentials are stored. At step 610, a halt operations command may be executed for a predetermined amount of time such as, for example, at least once every 15 minutes. The delay time may vary according to computing limitation within a system such as, for example, processing time required for the EPV to reach out to all databases and update the passwords inside the database to match what is in the EPV. At step 612, user credentials may be updated in an SSIS database. It will be appreciated that user credentials may be updated in substantially the same way as described with reference to process flow 500. At step 614, jobs which were stopped at step 606 may be resumed. At step 616, jobs which missed the schedule during the password change may be started. At step 618, all remaining jobs may be enabled.

Figure 7:
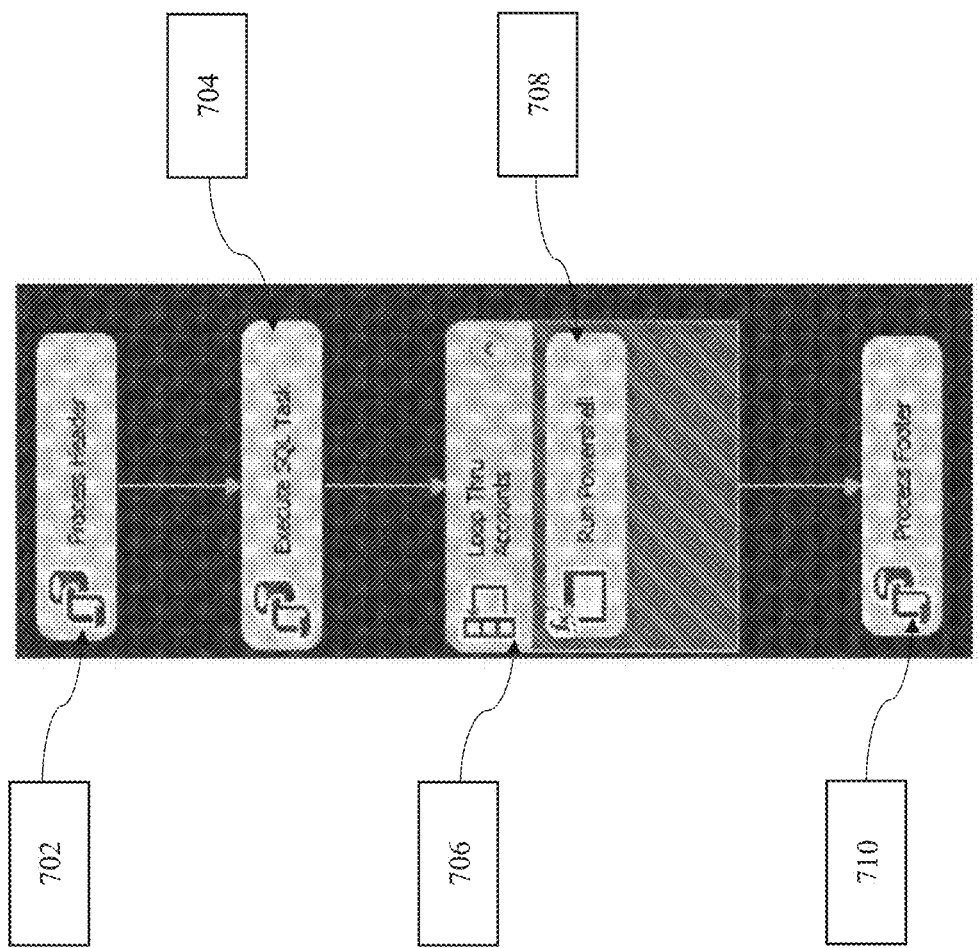
FIG. 7 is a flowchart of an exemplary SQL process for implementing a method for facilitating automatic updating of passwords in a SSIS database based on data in an EPV.

FIG. 7 is a flowchart of an exemplary SQL process for implementing a method for facilitating automatic updating of passwords in a SSIS database based on data in an EPV. Process flow 700 begins at process header 702. Process header 702 may include a header file that contains function declarations and macros used in computing threads and processes. Process header 702 may execute the declarations and macros at execute SQL task 704. Then, at process 706, executed SQL task 704 may be looped through accounts in a SSIS database to trigger run PowerShell 708. Run PowerShell 708 may include a task automation and configuration management framework that includes a command-line shell and associated scripting language. Finally, process flow 700 may terminate at process footer 710.

Accordingly, with this technology, an optimized process for facilitating automatic updating of passwords in a SSIS database based on data in an EPV is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating credential management in a Structured Query Language (SQL) Server Integration Services (SSIS) environment, the method being implemented by at least one processor, the method comprising:

identifying, by the at least one processor, at least one credential update trigger event;

capturing, by the at least one processor, a run status for each of a plurality of jobs that is active in the SSIS environment;

accessing, by the at least one processor, at least one user credential at an electronic password vault (EPV) in response to the at least one credential update trigger event, the at least one user credential including at least one string;

parsing, by the at least one processor, the at least one user credential to identify a username and a password that are associated with the at least one user credential;

splitting, by the at least one processor, the at least one user credential into the username and the password by,
generating, by the at least one processor, at least one row of substrings based on a specified separator, the at least one row including the username and the password;

disabling, by the at least one processor, the plurality of jobs based on the captured run status;

updating, by the at least one processor, the password; and storing, by the at least one processor, the updated password in a SSIS database.

2. The method of claim 1, wherein the at least one credential update trigger event includes at least one from among a periodic credential update schedule and an episodic credential update schedule, the periodic credential update schedule including at least once every sixty days.

3. The method of claim 1, wherein the at least one string includes at least one from among a string of alphanumeric text and a string of character symbols.

4. The method of claim 1, wherein when the at least one credential update trigger event is identified, the method further comprises:

identifying, by the at least one processor, at least one job that is associated with the at least one user credential, the at least one job including a currently executing job;

determining, by the at least one processor, a stopping point for the at least one job;

disabling, by the at least one processor, the at least one job based on the determined stopping point; and preventing, by the at least one processor, at least one new job that is associated with the at least one user credential from executing.

5. The method of claim 4, wherein the stopping point includes a point in a process flow when the at least one job has completed at least one task.

6. The method of claim 1, wherein the updating further comprises:

decrypting, by the at least one processor, the password that is associated with the at least one user credential;

automatically generating, by the at least one processor via a password generator, a new password based on a predetermined requirement;

replacing, by the at least one processor, the decrypted password with the new password; and encrypting, by the at least one processor, the new password.

7. The method of claim 6, further comprising:

automatically generating, by the at least one processor, at least one electronic document that includes information relating to the updating, the information including a timestamp of when the updating occurred; and storing, by the at least one processor, the at least one electronic document in the SSIS database.

8. The method of claim 7, further comprising:
receiving, by the at least one processor via a graphical user interface, at least one request for a record of the updating;
obtaining, by the at least one processor from the SSIS database, the at least one electronic document corresponding to the request;
automatically generating, by the at least one processor, the record based on the obtained at least one electronic document; and
displaying, by the at least one processor via the graphical user interface, the generated record.

9. The method of claim 6, wherein the predetermined requirement includes at least one from among a password length requirement, a password complexity requirement, and a previous use of the password requirement.

10. The method of claim 1, wherein the at least one user credential at the EPV is accessed by using an application programming interface (API) call.

11. A computing device configured to implement an execution of a method for facilitating credential management in a Structured Query Language (SQL) Server Integration Services (SSIS) environment, the computing device comprising:
a processor;
a memory; and
a communication interface coupled to each of the processor and the memory,
wherein the processor is configured to:
identify at least one credential update trigger event;
capture a run status for each of a plurality of jobs that is active in the SSIS environment;
access at least one user credential at an electronic password vault (EPV) in response to the at least one credential update trigger event, the at least one user credential including at least one string;
parse the at least one user credential to identify a username and a password that are associated with the at least one user credential;
split the at least one user credential into the username and the password by causing the processor to,
generate at least one row of substrings based on a specified separator, the at least one row including the username and the password;
disable the plurality of jobs based on the captured run status;
update the password; and
store the updated password in a SSIS database.

12. The computing device of claim 11, wherein the at least one credential update trigger event includes at least one from among a periodic credential update schedule and an episodic credential update schedule, the periodic credential update schedule including at least once every sixty days.

13. The computing device of claim 11, wherein the at least one string includes at least one from among a string of alphanumeric text and a string of character symbols.

14. The computing device of claim 11, wherein when the at least one credential update trigger event is identified, the processor is further configured to:
identify at least one job that is associated with the at least one user credential, the at least one job including a currently executing job;
determining a stopping point for the at least one job;
disable the at least one job based on the determined stopping point; and
prevent at least one new job that is associated with the at least one user credential from executing.

15. The computing device of claim 14, wherein the stopping point includes a point in a process flow when the at least one job has completed at least one task.

16. The computing device of claim 11, wherein, for the updating, the processor is further configured to:
decrypt the password that is associated with the at least one user credential;
automatically generate, via a password generator, a new password based on a predetermined requirement;
replace the decrypted password with the new password; and
encrypt the new password.

17. The computing device of claim 16, wherein the processor is further configured to:
automatically generate at least one electronic document that includes information relating to the updating, the information including a timestamp of when the updating occurred; and
store the at least one electronic document in the SSIS database.

18. The computing device of claim 17, wherein the processor is further configured to:
receive, via a graphical user interface, at least one request for a record of the updating;
obtain, from the SSIS database, the at least one electronic document corresponding to the request;
automatically generate the record based on the obtained at least one electronic document; and
display, via the graphical user interface, the generated record.

19. The computing device of claim 16, wherein the predetermined requirement includes at least one from among a password length requirement, a password complexity requirement, and a previous use of the password requirement.

20. The computing device of claim 11, wherein the processor is further configured to access the at least one user credential at the EPV by using an application programming interface (API) call.

* * * * *